(12) United States Patent
Maas et al.

(10) Patent No.: US 7,397,884 B2
(45) Date of Patent: Jul. 8, 2008

(54) ALIGNING DEVICE FOR FUEL ELEMENTS OF A PRESSURIZED WATER REACTOR

(75) Inventors: Heinz Maas, Neu-Anspach (DE); Holger Weimer, Puschendorf (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/273,148

(22) Filed: Nov. 14, 2005

(65) Prior Publication Data

US 2006/0159216 A1 Jul. 20, 2006

Related U.S. Application Data

(63) Continuation of application No. PCT/EP2004/005141, filed on May 13, 2004.

(30) Foreign Application Priority Data

May 14, 2003 (DE) ............................. 103 21 827

(51) Int. Cl.
*G21C 19/00* (2006.01)
(52) U.S. Cl. ................. 376/261; 376/264; 376/268; 72/393
(58) Field of Classification Search ............ 376/260, 376/261, 264, 268, 269; 72/393
See application file for complete search history.

(56) References Cited

U.S. PATENT DOCUMENTS

| | | | | |
|---|---|---|---|---|
| 2,582,927 A | * | 1/1952 | Dall ............................. | 292/52 |
| 2,989,333 A | * | 6/1961 | Fox ............................. | 292/280 |
| 3,092,065 A | * | 6/1963 | Kummerman ............... | 114/202 |
| 3,147,893 A | * | 9/1964 | Mittelsteadt ................ | 222/306 |
| 3,385,120 A | * | 5/1968 | Nott ............................ | 74/107 |
| 3,414,858 A | * | 12/1968 | Wharton et al. .............. | 337/13 |
| 3,523,317 A | * | 8/1970 | Dunlap et al. ................ | 12/12 |
| 3,618,160 A | * | 11/1971 | Ellis ............................ | 16/55 |
| 3,798,966 A | * | 3/1974 | Planche ..................... | 73/152.02 |
| 4,311,557 A | * | 1/1982 | Kowalski et al. ............. | 376/271 |
| 4,511,531 A | * | 4/1985 | Swidwa et al. .............. | 376/262 |
| 4,676,945 A | * | 6/1987 | Barkhurst ................... | 376/261 |
| 4,781,882 A | * | 11/1988 | Salton et al. ................ | 376/271 |
| 4,788,028 A | * | 11/1988 | Leclerco et al. ............. | 376/264 |
| 4,811,181 A | * | 3/1989 | Jones ......................... | 362/287 |
| 5,064,066 A | * | 11/1991 | Barnes ....................... | 206/395 |

(Continued)

FOREIGN PATENT DOCUMENTS

EP 1 411 528 A1 4/2004

(Continued)

*Primary Examiner*—Rick Palabrica
(74) *Attorney, Agent, or Firm*—Laurence A. Greenberg; Werner H. Stemer; Ralph E. Lochner

(57) ABSTRACT

An aligning device for fuel elements allows fuel elements of a pressurized water reactor to be aligned in a comparatively easy and quick manner. To this end, the aligning device for fuel elements includes an aligning body, which extends in a longitudinal direction and whose lateral faces formed from side metal sheets can be displaced out of a position of rest in a direction that is perpendicular to the longitudinal direction. The cross-sectional dimensions of the lateral faces of the aligning body in the position of rest are selected so that they are less than the corresponding cross-sectional dimension of a reference fuel element by a predetermined nominal value.

10 Claims, 4 Drawing Sheets

U.S. PATENT DOCUMENTS

| | | | |
|---|---|---|---|
| 5,169,185 A | * 12/1992 | Slaybaugh et al. | 292/92 |
| 5,420,899 A | * 5/1995 | Apple et al. | 376/261 |
| 5,619,547 A | 4/1997 | Amiet et al. | |
| 2006/0056568 A1 | 3/2006 | Jullien | |

FOREIGN PATENT DOCUMENTS

| | | |
|---|---|---|
| WO | WO 95/23414 | 8/1995 |

\* cited by examiner

ALIGNING DEVICE FOR FUEL ELEMENTS OF A PRESSURIZED WATER REACTOR

BACKGROUND OF THE INVENTION

Field of the Invention

The invention relates to an alignment apparatus for fuel elements in a pressurized-water reactor.

In a nuclear installation, in particular in a nuclear power plant, fissionable material is normally subjected to monitored nuclear fission in order to produce electrical power. The fissionable material is in this case kept in a number of fuel rods in which the material, for example in the form of so-called pellets, is surrounded by suitable casing tubes. A plurality of such fuel rods are in this case normally combined to form a fuel element. A nuclear power plant has a large number of these fuel elements which are shaped essentially in the form of elongated cuboids or, in particular, even elongated squares, and are located in the reactor core. In this case, the fuel elements are located alongside one another in a fuel element bearing frame which is located in the reactor core, with adjacent fuel elements being positioned a comparatively short distance apart from one another. In order to control the nuclear reaction, a plurality of these fuel elements have control elements, so-called control rods, which are introduced into the fuel elements through control rod guide tubes which are contained in the fuel elements. The control rod guide tubes of so-called restrictor bodies are encapsulated in those fuel elements which have no control rods. These are required in order to distribute the coolant flow uniformly through the reactor core.

During the course of the operating life of a nuclear reactor, the nuclear fuel which is contained in the fuel elements is consumed, with the consequence that fuel elements have to be replaced from time to time. For this purpose, spent fuel elements have to be moved from the reactor core to a fuel element storage pool, and fresh, unused or only partially spent fuel elements have to be moved from the fuel element storage pool to the reactor core. Fuel elements are generally replaced after a nuclear power plant operating cycle of several months, in particular 12 to 18 months. The nuclear power plant must be shut down for this purpose, and the reactor core must be depressurized. The reactor core is made accessible from above by disassembly of the pressure vessel cover and by removal of various fittings. This is done with the reactor pool flooded, in order to provide a water shield for the exposed reactor core.

In order to keep the loss of energy generated during the replacement of the fuel elements low, it is desirable to replace the fuel elements in as short a time interval as possible. In general, a so-called fuel element loading machine is used for replacement of the fuel elements, and is in the form of a crane-like lifting apparatus. This loading machine can approach the various positions of the fuel elements to be replaced by means of an appropriate crane structure, which is arranged above the reactor pool, and can withdraw a fuel element, by means of an appropriately designed gripper, with a vertical movement upward, out of the fuel element bearing frame or the reactor core. The gripper is in this case designed such that it is generally possible not only to raise and to move each fuel element and control rod individually, but also alternatively to raise and to move a fuel element and a control rod jointly.

During the replacement of fuel elements in nuclear installations, in particular in the case of pressurized-water reactors, one problem, however, is that the operating influences, such as the radioactive radiation, the temperature, the pressure and inert gases which act on the fuel rods, can lead to them deforming. This deformation may be evident on the one hand as bending in the longitudinal direction of the fuel elements or else in the form of rotation of the fuel elements with respect to the longitudinal axis, in the form of twisting.

Such deformation makes it considerably harder to replace fuel elements, since adjacent fuel elements can collide with one another during replacement of a fuel element. Furthermore, the necessary separation between adjacent fuel elements may no longer exist at a number of points, owing to the deformation of the fuel elements, when a fuel element is being lifted out vertically.

A collision between fuel elements during fuel element replacement can lead to damage to individual fuel elements. Furthermore, it is possible that a fuel element cannot, in particular, be inserted into an empty location in the reactor core owing to the deformation of the adjacent fuel elements. In this case, an iterative procedure is generally used in an attempt to insert a fuel element into the reactor core by repeated rotation and lateral movement of the loading machine. This procedure is highly time-consuming since a number of attempts generally have to be made to insert a fuel element into the reactor core, and is thus highly costly owing to the longer production downtime associated with this.

SUMMARY OF THE INVENTION

The invention is thus based on the object of specifying an alignment apparatus for fuel elements in a pressurized-water reactor as described above, by means of which fuel elements can be aligned comparatively easily and quickly.

According to the invention, this object is achieved in that the alignment apparatus has an alignment body which is extended in the longitudinal direction and whose side surfaces, which are formed by side plates, can be moved from a rest position at right angles to the longitudinal direction, with the cross-sectional dimensions of the side surfaces of the alignment body in the rest position being chosen to be smaller by a predetermined nominal value than the corresponding cross-sectional dimension of a reference fuel element.

The invention is in this case based on the idea that deformed fuel elements should be aligned by means of an appropriate alignment apparatus in such a way that the alignment apparatus allows the replacement of the fuel elements and, in particular, the insertion of a fuel element into an empty location in the reactor core by correcting the shape of the fuel elements. It should thus be possible to position the alignment apparatus at an empty location in the fuel element bearing frame, in order to align the adjacent fuel elements for insertion of a new fuel element at the empty location. In order to allow the alignment apparatus itself to be moved to the empty position easily and without touching deformed adjacent fuel elements, the cross section of the alignment apparatus should be smaller than that of a corresponding reference fuel element, in order that the alignment apparatus does not collide with deformed adjacent fuel elements during insertion into the reactor core. The cross-sectional limiting of the alignment body of the alignment apparatus in the rest position thus allows it to be positioned at an empty location in the reactor core. In order to allow it to have a correcting effect on the adjacent fuel elements as well, starting from this position, the alignment apparatus is provided with moving side plates. These can appropriately correct deformation of adjacent fuel elements over their entire surface facing the alignment body. For this purpose, the cross section of the alignment body can be changed by movement of two opposite side plates from the rest position in each case in one lateral direction of the alignment apparatus, particularly with the cross section being enlarged for alignment. In this case, the alignment apparatus is in each case supported on both sides in a lateral direction when it is enclosed with adjacent fuel elements, by contact points between two fuel elements that are adjacent to it. The fuel elements to be aligned are themselves supported by adjacent fuel elements on the side facing away from the alignment apparatus.

In order to additionally allow the alignment apparatus to be used with comparatively major deformation of the fuel elements in an empty location, the nominal value of the alignment apparatus is advantageously 16 mm.

In order to hold a side plate of the alignment body such that it can move with respect to the alignment apparatus, a side plate advantageously has a number of associated slotted-link guides via which a side plate is attached to the alignment apparatus via associated displacement bolts. The slotted-link guides are expediently shaped for this purpose in such a way that they convert a movement of the displacement bolts in the longitudinal direction to a movement of the side plates at right angles to the longitudinal direction.

In order to ensure that a side plate moves in a direction precisely at right angles to the longitudinal axis of the alignment apparatus and in order to ensure that the attachment of a side wall to the alignment apparatus is sufficiently robust, a side plate expediently has a number of guide grooves in each case on a fitting, which guide grooves run at right angles to the longitudinal direction of the side plate and into each of which an associated displacement bolt engages, which is moved and guided within a supporting frame for the alignment apparatus.

In order to hold side plates of an alignment apparatus and, in particular and in addition, all of the side plates jointly such that they can be moved during the alignment process of fuel elements, displacement bolts which are associated with one slotted-link guide are preferably connected to one another via an attachment apparatus, which can be moved hydraulically or mechanically in the longitudinal direction of the alignment apparatus. In this arrangement, the alignment movement of the moveable side plates can be controlled via the movement of the attachment apparatus.

In order to allow an alignment process for fuel elements to be repeated and in order to ensure that the alignment body of the alignment apparatus is in a rest position while an alignment apparatus is being inserted into or moved out of an empty location in the reactor core, a display apparatus for monitoring the spread position is expediently provided, in order to prevent collisions with adjacent fuel elements.

In order to hold the attachment apparatus for the alignment apparatus such that it is accessible and, in particular, in order to allow it to move to carry out the alignment process, the attachment apparatus is expediently connected to the moveable head of the alignment apparatus. The alignment process can thus be controlled and carried out via the movement of the head of the alignment apparatus.

In order to allow the loading machine to be used for positioning of the alignment apparatus in the reactor core and to allow the alignment process to be carried out using the loading machine, the head of the alignment apparatus preferably has the same dimensions as the fuel element head of a reference fuel element. These dimensions mean that the alignment apparatus for the gripper of the loading machine is compatible with the fuel elements.

The advantages which are achieved by the invention are, in particular, that the alignment apparatus as described above can be used to align fuel elements in a pressurized-water reactor in a simple and comparatively fast manner, and allows deformation of such fuel elements to be corrected, so that fuel elements can be inserted comparatively quickly into the reactor core, since no time is lost as a result of failed attempts to insert fuel elements into the reactor core. This reduces the time period for replacement of all of the fuel elements to be replaced, and the production downtime associated with this during a nuclear power plant maintenance cycle.

A further advantage of the alignment apparatus is that the deformation of fuel elements to be aligned need not be localized, since a fuel element can be aligned over its entire length by the alignment apparatus. Furthermore, the repetition of the spreading movement a plurality of times in a rest position means that the alignment process can be repeated as often as required until the fuel elements are aligned adequately. The alignment apparatus may in particular also be designed for movement of its active components in a purely mechanical manner, and without any auxiliary power being supplied.

The fact that the dimensions of the head of the alignment apparatus are the same as those of a fuel element head means that the fuel element loading machine can be used not only for transportation but also for carrying out the alignment process, so that no additional infrastructure for operation of the alignment apparatus is required in the reactor core or in the reactor pool. Apart from this, the dimensions of the alignment apparatus also mean that it is particularly suitable for use as so-called fuel element or supporting damping in the form of a spacer for temporarily filling an empty location in the fuel element pattern. The suitable dimensions of the cross section of the alignment apparatus and, furthermore, the friction forces between the fuel elements and the alignment apparatus are held in a particularly suitable manner during raising and lowering.

One exemplary embodiment of the invention will be explained in more detail with reference to a drawing, in which:

BRIEF DESCRIPTION OF THE DRAWINGS

Identical parts are provided with the same reference symbols in all of the figures.

DESCRIPTION OF THE PREFERRED EMBODIMENTS

Figure 1:
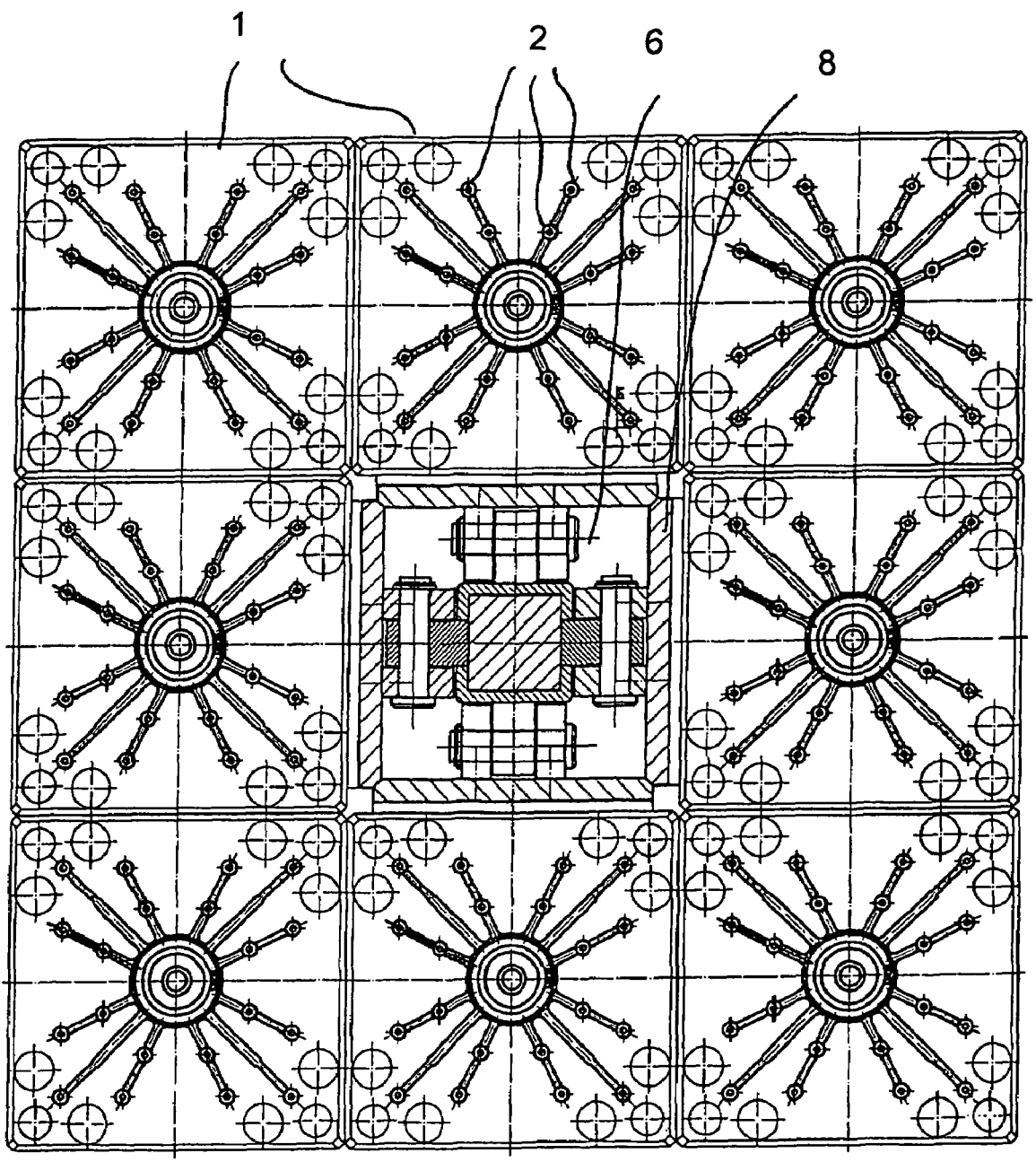
FIG. 1 shows a plan view of the reactor core of a pressurized-water reactor.

FIG. 1 shows, schematically, a plan view of a reactor core of a pressurized-water reactor with fuel elements 1 which contain a number of fuel rods 2. In this case, as can be seen from FIG. 1, these fuel elements 1 are arranged a comparatively short distance apart from one another, with their lengths being positioned in the reactor core.

Figure 2:
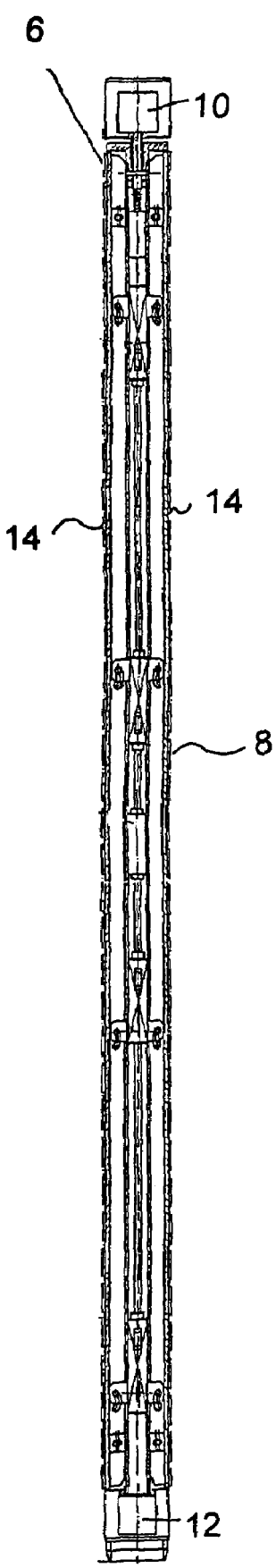
FIG. 2 shows a longitudinal section through an alignment apparatus.

In order to align the fuel elements 1 and to correct for deformation on their side walls, FIG. 2 illustrates an alignment apparatus 6 for fuel elements 1. This alignment apparatus 6 is designed for alignment of fuel elements 1 in such a way that it can be positioned at an empty location in the reactor core of the pressurized-water reactor, in particular even when adjacent fuel elements 1 are deformed. For this purpose, the dimensions of the cross section of the alignment apparatus 6 are such that, in a rest position, it has a smaller cross section than a fuel element 1. As can be seen from FIG.

2, the alignment apparatus has external contours which are similar to those of a fuel element 1, since it is composed of an alignment body 8 as well as a head 10 and a foot 12, so that it can be positioned in the reactor core and also in the fuel element bearing frame 4. In order to allow fuel elements 1 to be aligned, the alignment body 8 of the alignment apparatus 6 is extended in the longitudinal direction, with its side surfaces being formed from side plates 14 which can be moved at right angles to the longitudinal direction and thus sideways from a rest position. The side plates 14 are in this case designed in such a way that the cross-sectional dimensions of the side surfaces of the alignment body 8 are chosen to be smaller by a predetermined nominal value than those of a fuel element 1 when the side plates 14 are in a rest position. The cross section of the alignment body 8 can then be enlarged in a monitored manner by lateral movement of the side surfaces 14.

Figure 3:
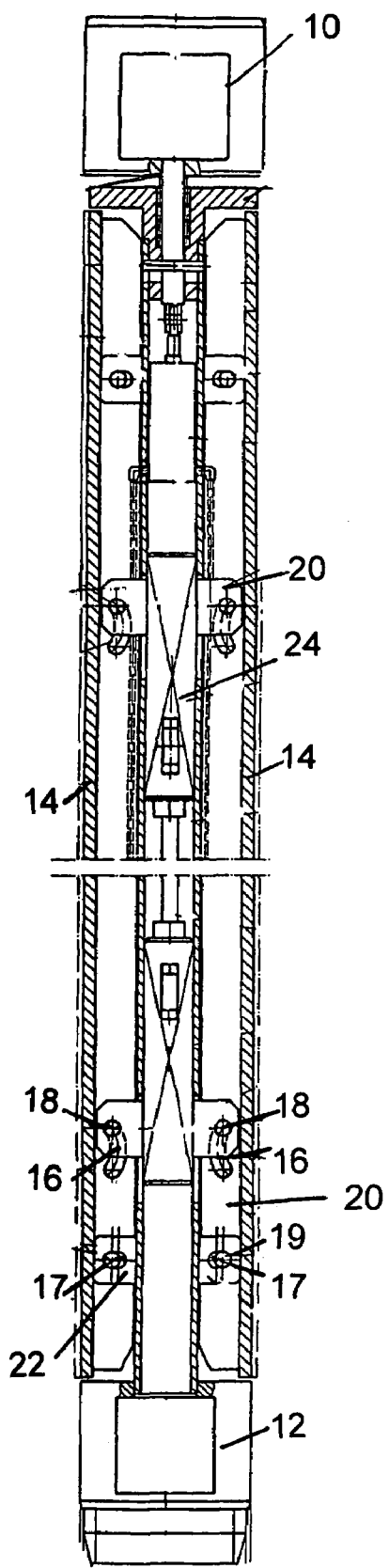
FIG. 3 shows a detail from FIG. 2.

In order to hold the side plates 14 of the alignment body 8 such that they can be moved for the alignment process, the side plates (as can be seen from the somewhat more detailed illustration in FIG. 3) have a number of associated slotted-link guides 16, via which the side plates 14 are attached via associated displacement bolts 18 to the alignment apparatus 6, with the slotted-link guides 16 being shaped in such a way that they convert a movement of the displacement bolts 18 in the longitudinal direction to a movement of the side plates 14 at right angles to the longitudinal direction. The slotted-link guides 16 are introduced into booster ribs 20 for this purpose, with the booster ribs 20 being connected to the side plates 14.

In order that the movement of the side plates 14 is as linear as possible during the alignment process in a direction at right angles to the longitudinal direction of the alignment apparatus 6 and in order to ensure that the side plates 14 are attached to the alignment apparatus 6 in a sufficiently robust manner, each moveable side plate 14 in each case has a number of associated guide grooves 19, which run at right angles to the longitudinal direction of the alignment body 8 and into each of which an associated holding bolt 17 engages, which is in each case attached to a holding pocket 22.

In order to hold the side plates 14 of an alignment apparatus 6 and, in particular, all of the side plates 14 jointly as well such that they can be moved during the process of aligning fuel elements 1, all of the supporting lugs for the displacement bolts 18 are connected to one another via a driver 24, which can be moved hydraulically or mechanically from the rest position with respect to the side plates 14 in the longitudinal direction of the alignment apparatus 6. In particular, this can be implemented in such a way that the required initial forces are applied by selective movement of the head 10 in the longitudinal direction of the alignment body 8, in the form of a pumping or engaging movement.

A linear-movement pump is operated by repeating the linear movement (raising and lowering the fuel element gripper) on the head 10 a plurality of times via a shaft which can be moved within the supporting and guide sleeve, with this pump being connected to a centrally arranged linear-movement cylinder. The drivers are moved by the linear-movement cylinder by means of connecting rods. When the linear-movement cylinder is in the limit positions, operating elements via which the direction of the linear movement can be mechanically converted are located in such a way that the spreading or alignment process is repeated when further linear movement takes place.

In order to allow the fuel element loading machine, by means of which the fuel elements 1 are moved, to be used for transportation and control of the alignment process of the alignment apparatus 6, the head 10 has the same dimensions as the head of a fuel element 1.

Figure 4:
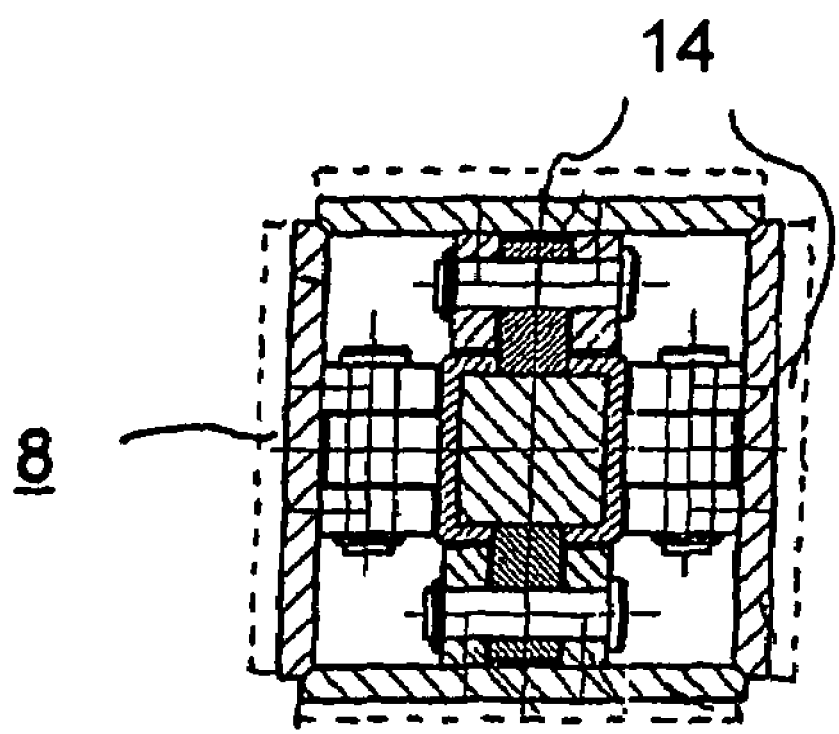
FIG. 4 shows a cross section through the alignment apparatus shown in FIG. 2.

In order to allow the alignment body 8, and hence also the alignment apparatus 6, to be positioned at an empty location in the reactor core even in the event of comparatively major deformation of the fuel elements 1, the nominal value is 16 mm. A cross section of the alignment apparatus 6 is illustrated in FIG. 4 in order to provide a better illustration of the cross-sectional dimensions of the alignment body 8. In this case, the alignment body 8 is illustrated positioned in line with the side plates 14. In contrast, the dashed lines in the illustration show the engaged position, in which the side plates 14 have been moved outward by the specified nominal values in order to carry out an alignment process, so that this results in the enlargement of the cross section that is required for alignment.

LIST OF REFERENCE SYMBOLS

1 Fuel element
2 Fuel rod
6 Alignment apparatus
8 Alignment body
10 Head
12 Foot
14 Side plate
16 Slotted-link guide
17 Holding bolt
18 Displacement bolt
19 Guide groove
20 Booster rib
22 Holding lug
24 Driver

We claim:

1. An alignment apparatus for a fuel element in a pressurized-water reactor, comprising:
    an alignment body having a given overall length in a longitudinal direction, said alignment body having side surfaces formed of side plates and a cross-sectional dimension defined by said side surfaces of said alignment body, said cross-sectional dimension of said alignment body, in a rest position, being smaller by a predetermined nominal value than a corresponding cross-sectional dimension of a reference fuel element, said side surfaces having an overall length in the longitudinal direction being substantially the same as said given overall length of said alignment body in the longitudinal direction, and said side surfaces being constructed for being moveable from the rest position perpendicularly to the longitudinal direction thereby enlarging said cross-sectional dimension of said alignment body for correctively altering the fuel element over its entire length.

2. The alignment apparatus according to claim 1, wherein said predetermined nominal value is 16 mm.

3. The alignment apparatus according to claim 1, wherein said moveable side plates have one or a plurality of associated slotted-link guides attaching said side plates via associated displacement bolts to a supporting structure, and wherein said slotted-link guides are shaped to convert a movement of said displacement bolts in the longitudinal direction to a movement of said side plates in a direction perpendicular to the longitudinal direction.

4. The alignment apparatus according to claim 3, wherein said displacement bolts associated with one of said slotted-link guides for said side plates are connected to one another via an attachment apparatus, and said attachment apparatus is disposed to be moved hydraulically or mechanically from the rest position with respect to said side plates in the longitudinal direction of said alignment body.

5. The alignment apparatus according to claim 4, wherein said attachment apparatus is connected to a longitudinally movable head of the alignment apparatus.

6. The alignment apparatus according to claim 5, wherein said head is dimensioned in accordance with a fuel element head of the reference fuel element.

7. The alignment apparatus according to claim 1, wherein each of said movable side plates has a fitting and said fitting has a plurality of guide grooves formed therein, said guide grooves extend at right angles to the longitudinal direction of said alignment body, and an associated holding bolt engages into each of said guide grooves and is attached to a supporting frame.

8. The alignment apparatus according to claim 7, wherein said side plates are connected to one another via an attachment apparatus, and said attachment apparatus is mounted to be moved hydraulically or mechanically from the rest position with respect to said side plates in the longitudinal direction of said alignment body.

9. The alignment apparatus according to claim 8, wherein said attachment apparatus is connected to a longitudinally movable head of the alignment apparatus.

10. The alignment apparatus according to claim 9, wherein said head is dimensioned in accordance with a fuel element head of the reference fuel element.

* * * * *